United States Patent [19]

Walters et al.

[11] Patent Number: 4,698,212

[45] Date of Patent: Oct. 6, 1987

[54] PROCESS AND APPARATUS FOR COOLING DURING REGENERATION OF FLUID CRACKING CATALYST

[75] Inventors: Paul W. Walters, Ashland; H. Anthony Raiche, Russell, both of Ky.; Ronald L. Harness; Genaro M. Quodala, both of Huntington, W. Va.

[73] Assignee: Ashland Oil, Inc., Ashland, Ky.

[21] Appl. No.: 809,560

[22] Filed: Dec. 16, 1985

Related U.S. Application Data

[62] Division of Ser. No. 747,461, Jun. 21, 1985, Pat. No. 4,614,726.

[51] Int. Cl.⁴ .............................................. B01J 8/18
[52] U.S. Cl. .................................. 422/144; 208/153; 208/159; 208/160; 422/145; 422/146; 422/147
[58] Field of Search ............... 422/144, 145, 146, 147; 208/153, 159, 160; 502/41, 44

[56] References Cited

U.S. PATENT DOCUMENTS

| | | | |
|---|---|---|---|
| 4,010,003 | 3/1977 | Pulak | 422/144 |
| 4,060,395 | 11/1977 | Costagnos et al. | 422/144 |
| 4,097,243 | 6/1978 | Bartholic | 422/144 |
| 4,283,273 | 8/1981 | Owen | 422/147 |
| 4,374,750 | 2/1983 | Vickers et al. | 422/144 |
| 4,424,192 | 1/1984 | Lomas et al. | 422/144 |

Primary Examiner—Barry S. Richman
Assistant Examiner—William R. Johnson
Attorney, Agent, or Firm—Richard C. Willson, Jr.; C. William Crady

[57] ABSTRACT

In an apparatus for the regeneration of fluid cracking catalyst, the catalyst is cooled in a heat exchanger mounted to the lower side of the regenerator and cool catalyst is returned to the regenerator by means of a separate gas lift.

6 Claims, 1 Drawing Figure

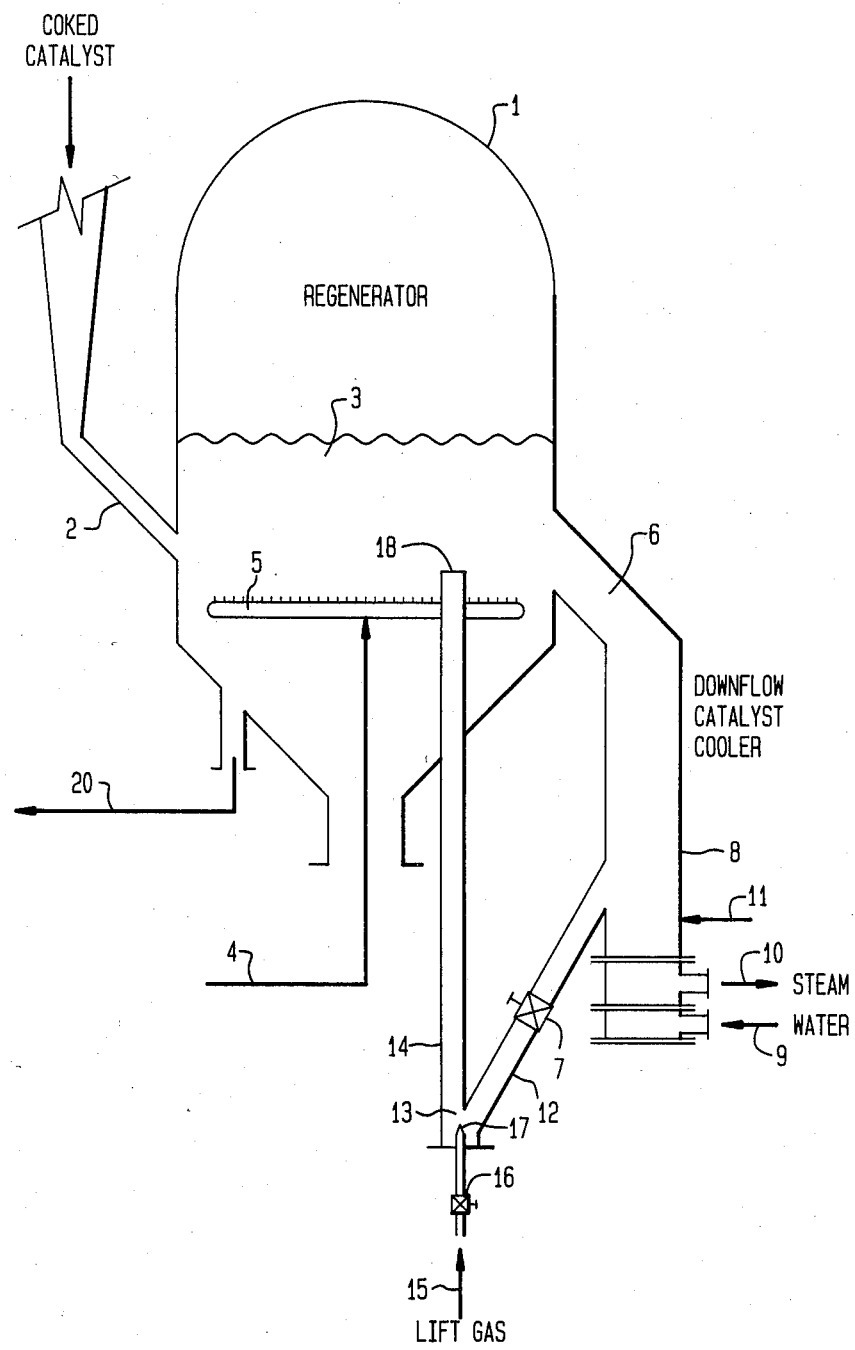

PROCESS AND APPARATUS FOR COOLING DURING REGENERATION OF FLUID CRACKING CATALYST

This application is a division of application Ser. No. 747,461, filed June 21, 1985 now U.S. Pat. No. 4,614,726, issued Sept. 30, 1986.

CROSS REFERENCES TO RELATED APPLICATIONS

U.S. Ser. No. 532,253 filed Sept 15, 1983 (abandoned); U.S. Ser. No. 688,469 filed Jan. 3, 1985 now U.S. Pat. No. 4,582,120; U.S. Ser. No. 617,764 filed June 6, 1984 (abandoned); and U.S. Ser. No. 355,661 filed Mar. 12, 1982 (pending) relate to the general field of the present invention.

BACKGROUND

1. Field of the Invention

This invention relates to the field of hydrocarbon conversion with fluid catalytic cracking catalyst. In particular, it relates to the regeneration of coked catalyst by conversion of coke on catalyst with control of the temperature of regeneration.

2. Description of the Prior Art

The FCC process converts petroleum feedstocks boiling in the gas oil boiling range to lighter products such as gasoline. To obtain maximum conversion efficiency from the very active zeolite cracking catalyst, it is necessary to remove as much coke as possible during the regeneration step of the FCC process. Accordingly, modern regenerators are operated in the high temperature regeneration mode. Regeneration temperatures in the range of to 538° C. to 787° C. (1000° F. to 1450° F.), more preferably 621° C. to 732° C. (1150° F. to 1350° F.) and most preferably 677° C. (1250° F.) to 732° C. (1350° F.) are employed.

Increasingly, catalytic cracking units are being adapted to the conversion of feedstocks heavier than gas oil. Such carbo-metallic hydrocarbon oils contain relatively large amounts of coke precursors, e.g. asphaltenes and heavy aromatic hydrocarbons. In addition, carbo-metallic cracking feedstocks contain complex organo-metallic compounds which deposit on the cracking catalyst as it circulates between the cracking zone and the regeneration zone. The most difficult problem encountered in the conversion of carbo-metallic oils is the high temperatures which can occur during the burning of carbon from the fluid catalyst particles. Since the hi-tech zeolite cracking catalyst by prolonged exposure to temperatures above about 704° C. (1300° F.) to 815° C. (1500° F.) is known to deteriorate, it is essential that the regeneration procedure be carefully controlled.

Various types of catalyst coolers are presently applied to regenerators and most of these coolers are based on indirect heat exchange employing tubular heat exchangers located inside or outside of the regenerator. Prior art FCC regenerators with coolers are disclosed in U.S. Pat. Nos. 2,377,935; 2,386,491; 2,662,050; 2,492,948; and 4,374,750.

The regenerator of the present invention is particularly applicable to control of catalyst cooling in situations where the catalytic cracking unit is revamped to convert feedstocks heavier than gas oil on a full or part-time basis. Two such cracking units are shown in Hydrocarbon Processing September, 1962, page 156 and Hydrocarbon Processing, September, 1970, page 177.

In addition, the process and apparatus of the present invention can be used in the regeneration of coked non-catalytic fluid solids like those used for decarbonization and demetallization of carbo-metallic feedstocks. One such process is disclosed in U.S. Pat. Nos. 4,469,588 to Hettinger et al (Ashland Oil, Inc.) 4,434,044 to Busch et al (Ashland Oil, Inc.) and 4,414,098 to Zandona et al (Ashland Oil, Inc.)

SUMMARY OF THE INVENTION

The present invention provides an economical means of adding a catalyst cooler to the regenerator of a fluid catalytic cracking unit. A heat exchanger is mounted on the bottom section of the regeneration vessel and following the cooling step the catalyst is returned to the regenerator by means of a gas lift device. The process and apparatus of the invention can be employed on an existing FCC in situations where it is desired to go from partial carbon monoxide burn to full CO burn and additional heat removal capacity is required to control regenerator temperature.

BRIEF DESCRIPTION OF THE DRAWING

The drawing is a sectional elevation of a regeneration apparatus according to the invention showing single stage regeneration, a downflow cooler and a gas lift device.

DESCRIPTION OF THE PREFERRED EMBODIMENTS

The present invention comprises a process and apparatus for the regeneration of coke contaminated fluid cracking catalyst wherein coke is burned from the catalyst in the dense bed of the regeneration zone while some catalyst is being continuously removed to and through a downflow cooler with continuous return of the cooled catalyst by vertical gas lift to the desired location in the dense bed.

The FCC feedstock, which results in a carbon-on-catalyst before regeneration above about 1%, can be desalted whole petroleum crude oil, atmospheric gas oil, vacuum gas oil, carbo-metallic fractions from various pretreating steps such as hydrodesulfurization, demetallization and solvent extraction, coker gas oil, visbroken stocks, recycle fractions and blends of the foregoig materials.

The fluid cracking catalyst used for cracking and requiring continuous regeneration may be of the conventional type such as activated clay, silica alumina, silica zirconia, etc. But natural and synthetic zeolite type catalysts comprising molecular sieves in a matrix having an average particles size ranging from about 30 to about 100 microns are preferred.

Following the cracking, disengaging and stripping steps, the catalyst is passed to the regenerator with a carbon burden of about 0.75 to 1.5 wt % carbon on catalyst. To maintain the cracking efficiency and the selectivity of the catalyst to gasoline and light hydrocarbon products, the carbon on catalyst should be reduced to less than about 0.1 wt % during regeneration.

One advantage of the present invention is that it provides an inexpensive apparatus (cooler) and process to control regeneration temperature without resorting to multi-stage regeneration. Another advantage of the invention is that continuous control of the cooling operation is maintained.

Referring now to the drawing, reference numeral 1 denotes the regenerator of a fluid catalytic cracking unit. Coked catalyst is stripped in a stripping unit, not shown, and passed via line 2 into the regenerator at a suitable level of the catalyst bed 3. Oxygen containing regeneration gas is passed by line 4 to air grid 5. Continuous combustion takes place in the catalyst bed as the regeneration gas (air) and the coke on the catalyst burn to form spent regeneration gas comprising $CO_2$ and CO and other gases. The ratio of CO to $CO_2$ depends on the amount of CO burning desired or required.

Spent regeneration gas is passed thru cyclones, not shown, and recovered.

Hot catalyst at a temperature of 621° C. to 815° C. (1150° F. to 1500° F.), preferably 649° C. to 760° C. (1200° F. to 1400° F.) is drawn from the bed of catalyst undergoing regeneration by line 6 under the control of valve 7. The catalyst migrates downwardly through cooler 8 in indirect contact with cooling fluid circulating through a tube bundle, not shown. In a preferred embodiment, coolant is supplied and removed at the bottom of the cooler. Water is supplied by line 9 and steam is removed by line 10. Fluidizing gas can be supplied by line 11.

As it passes through the cooler, the temperature of the catalyst is reduced by about 66° C. to 121° C. (about 150° F. to 250° F.). Cooled catalyst passes downwardly via line 12 to wye (Y shaped part) 13. The flow of catalyst is then turned in the apex of the wye to move vertically upward through lift line 14 to regenerator bed 3.

The flow of cooled catalyst is maintained by injecting a lift gas from line 15 through control valve 16 and through nozzle 17. The nozzle is placed at or near the center of line 14. The tip of the nozzle is located in wye 13. The nozzle can be any device which constricts gas flow and orients an accelerated flow of gas vertically up through the lift gas tube. The cooled fluidized catalyst is lifted to a desired level above air ring 5 and exits into the dense bed through port 18. It has been found that the cooled catalyst provides the best moderating effect when it is drawn from the dense bed and returned to the dense bed. Regenerated catalyst is removed from the regeneration by line 20 for passage to the cracking zone, not shown.

EXAMPLE

In a fluid catalytic cracking unit processing from about 750 to about 1,000 barrels (BBL) of petroleum feed per hour, the coked catalyst is regenerated in a single stage regenerator. The dense bed of the regenerator has an inventory of 50 tons of catalyst.

It is necessary to provide catalyst to the cracking stage at a temperature in the range of 677° C. to 746° C. (1250° F. to 1375° F.). It is also necessary to control regeneration temperature below 815° C. (1500° F.) to prevent damage to the catalyst.

Accordingly, 0 to 15 tons per minute of hot catalyst is passed to cooler 8. The catalyst is cooled to a temperature in the range of 593° C. to 649° C. (1100° F. to 1200° F.) in the cooler.

Lift gas provided at a rate of 4700 SCFM lifts the catalyst through line 14 to dense bed 3. Catalyst velocity is preferably 10 to 40, more preferably 15 to 30, feet per second.

The present apparatus provides a means of adding a cooling component to an existing regenerator vessel. Catalyst is cooled by gravity passage through a downflow catalyst cooler, cool catalyst passes by gravity flow to a wye and a lift gas-nozzle combination is employed to return cooled catalyst to the regenerator. The cooling system requires a minimal amount of space and a small quantity of piping, valves and controls. The addition of catalyst cooling enables the operator to use heavier feedstocks which will deposit more carbon on the fluid cracking catalyst. The additional heat release in the regenerator is compensated for by the cooler. The cooling process disclosed herein is controlled by a first valve which varies and controls flow of hot catalyst from the regenerator and second valve which varies and controls flow of cool catalyst into the regenerator. Thus positive flow control is maintained over the cooling system.

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Patents and literature referred to in the specification are expressly incorporated herein by reference including patents or other literature cited within them.

What is claimed is:

1. In an apparatus for the regeneration of coke contaminated fluid cracking catalyst, the combination comprising:
    A. an elongated upflow regeneration vessel, containing a dense bed of catalyst and a regeneration gas grid located within said bed;
    B. a vertical heat exchanger mounted to the lower side of said vessel adapted to receive hot catalyst directly from the regeneration vessel and adapted to cool the hot catalyst as it passes downwardly through the exchanger
    C. a Y junction positioned below the lower end of the heat exchanger;
    D. first conduit means for passing cool catalyst downwardly to said Y junction;
    E. second conduit means for passing cool catalyst from said Y junction upwardly into the dense bed of catalyst in the regeneration vessel, and
    F. regeneration gas supply means, separate from said second conduit means, for supplying regeneration gas to said gas grid;
    G. lift gas supply means, separate from said regeneration gas supply means, for introducing lift gas into said second conduit means so as to lift the cool catalyst up through said second conduit means to said regenerator.

2. Apparatus according to claim 1 in which the quantity of lift gas flowing to the nozzle is controlled by a valve positioned below said nozzle.

3. Apparatus according to claim 1 further comprising a valve located in said first conduit means for controlling the quantity of cool catalyst flowing from the catalyst cooler.

4. Apparatus according to claim 1 in which said second conduit means terminates in the dense bed of catalyst above the regeneration gas grid.

5. An apparatus according to claim 1 wherein the means for introducing lift gas comprises a nozzle within said Y.

6. In an apparatus for the regeneration of coke contaminated fluid cracking catalyst, the combination comprising:

A. an elongated upflow regeneration vessel, containing a dense bed of catalyst and a regeneration gas grid located within said bed;
B. an inlet line for passing coke contaminated fluid cracking catalyst to said dense bed;
C. an outlet line for removing regenerated catalyst from the dense bed of the regenerator,
D. a vertical heat exchanger mounted to the lower side of said vessel adapted to receive hot catalyst directly from the regeneration vessel and adapted to cool the hot catalyst as it passes downwardly through the exchanger;
E. a Y junction positioned below the lower end of the heat exchanger;
F. first conduit means for passing cool catalyst downwardly to said Y junction;
G. a first control valve in said first conduit adapted to vary the flow of hot catalyst from said regeneration vessel to said heat exchanger,
H. a lift gas inlet comprising a nozzle with a tip located in the center of said Y junction and further comprising a second control valve below said nozzle, said nozzle and said valve, providing a controlled, accelerated flow of lift gas,
I. a lift gas conduit for passing a mixture of cool catalyst and lift gas from said Y junction upward to a discharge port above said regeneration gas grid,
J. regeneration gas supply means, separate from said lift gas conduit, for supplying regeneration gas to said gas grid;
K. lift gas supply means, separate from said regeneration gas supply means, for introducing lift gas into said lift gas conduit means so as to lift the cool catalyst up through said lift gas conduit means to said regenerator.

* * * * *